Patented Nov. 18, 1924.

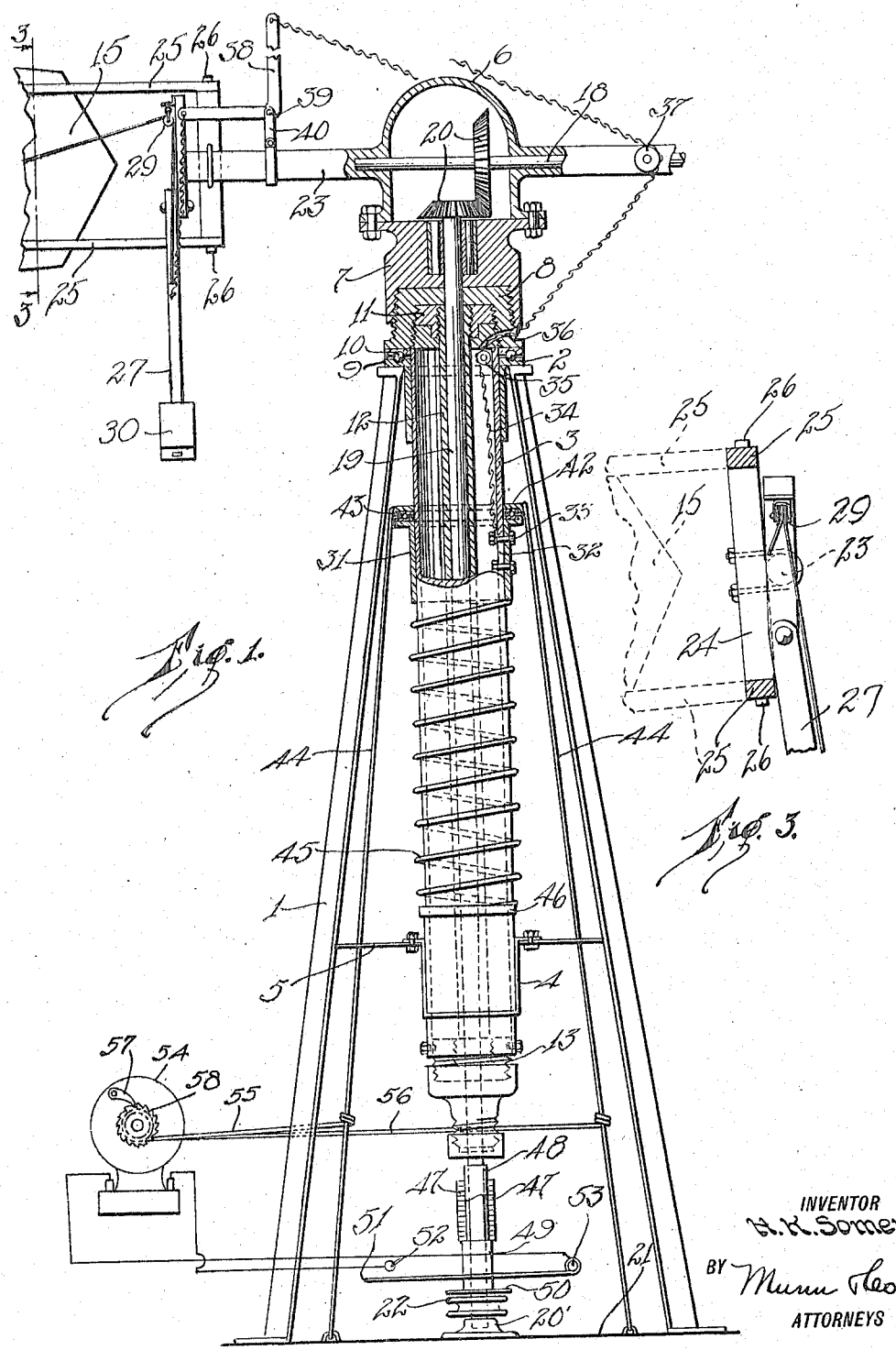

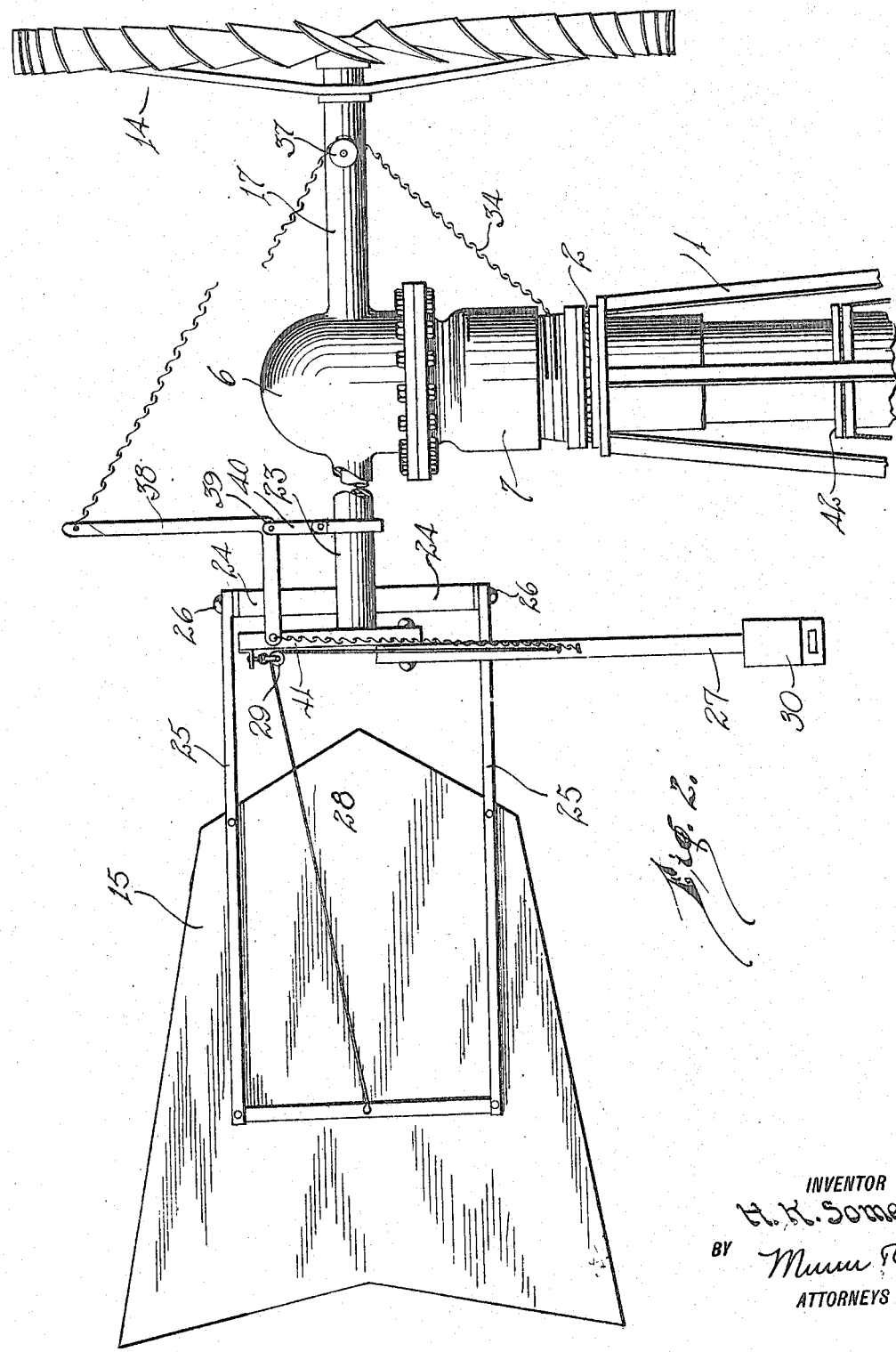

1,515,817

UNITED STATES PATENT OFFICE.

HARRY K. SOMERS, OF CHAMPAIGN, ILLINOIS.

WINDMILL.

Application filed December 26, 1922. Serial No. 609,033.

*To all whom it may concern:*

Be it known that I, HARRY K. SOMERS, a citizen of the United States, and a resident of Champaign, in the county of Champaign and State of Illinois, have invented a new and useful Improvements in Windmills, of which the following is a full, clear, and exact description.

My invention relates to improvements in wind mills, and it consists in the combinations, constructions, and arrangements herein described and claimed.

An object of my invention is to provide a wind mill which has novel means for regulating the speed of the wind mill irrespective of the velocity of air which is actuating the wind mill.

A further object of my invention is to provide a device of the character described which has novel means for stopping the operation of the wind mill at will, this means being manually or electrically controlled from the base of the wind mill.

A furthur object of my invention is to provide a device of the character described which is adapted to automatically aline itself in a direction parallel with the flow of air passing thereby.

A further object of my invention is to provide a device of the character described which has means for automatically slowing down the speed of the wind mill when it exceeds a predetermined speed.

A further object of my invention is to provide a device of the character described which is relatively simple in construction and which is durable and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of the device, portions thereof being broken away,

Figure 2 is an enlarged view of the top of the wind mill, and

Figure 3 is a section along the line 3—3 Figure 2.

In carrying out my invention, I provide a framework, indicated generally at 1, which in the present form of the device, comprises four uprights that taper toward each other. A bushing 2 is carried by the upper end of the framework 1 and rotatably supports a tubing 3. It is obvious that the framework 1 may be of any height desired, this height being determined by the requirements of the locality in which the device is disposed. The tubing 3 is also supported by a bearing 4 which is secured to the frame 1 by means of braces 5.

A head 6 is rigidly secured to a base 7 which in turn is connected to the tubing 3 by means of a nipple 8. The nipple 8 frictionally engages with a flange 9 of the tubing 3. Ball bearings 10 are disposed between the flange 9 and the bushing 2, whereby the tubing 3 is rotatably carried by the frame 1. The nipple 8 is internally threaded and carries a nut 11 which in turn supports the upper end of a pipe 12. The pipe 12 extends from the nut 11 down through the tubing 3 and is secured to a nut 13 at its lower end. The nut 13 is exteriorly threaded and receives the lower end of the tubing 3, whereby the tubing is held in adjusted position. From this construction it will be observed that the tubing 3 and pipe 12 turn as a unit, and they are rotated when the head 6 is rotated.

The head 6 is adapted to carry the fan 14 and the tail piece 15 (see Figure 2). The housing 6 is provided with a shaft housing 17 in which a shaft 18 is rotatably disposed, the shaft 18 being connected to a vertical shaft 19 by means of beveled gears 20. The shaft 19 is rotatably disposed within the pipe 12 and extends to a socket 20′ which is carried by the base 21. The rotation of the fan 14 will rotate the shaft 19 which in turn will rotate a drive pulley 22 that is carried by the lower end of the shaft 19. The tail piece 15 is pivotally carried by the housing 6. From Figure 2 it will be noted that the housing 6 has an extension 23 which carries arms 24, the latter pivotally carrying tail supporting members 25 at 26. The arms are inclined slightly from vertical (see Figure 3). It is obvious therefore that the tail piece 15 is adapted to swing parallel with respect to the plane of the fan 14 about the pivots 26. During the operation of the device, the propeller or fan 14 will tend to rotate the housing 6 with respect to the frame 1, but this movement is prevented by the tail piece 15.

I also provide a novel means for automatically regulating the speed of the fan 14 irrespective of the velocity of wind which actuates the fan. In this manner the device is especially adapted for use in charging storage batteries by dynamos, since for this work the speed of the dynamo has to be kept constant. It will be seen from Figures 1 and 3 that the support 23 carries a weighted arm 27, this arm being operatively connected to the tail piece 15 by means of a cable 28. The cable in turn is connected to the free end of the tail piece 15, is passed around an idler pulley 29, and is connected to the arm 27. A weight 30 is adjustably disposed on the lever 27 and may be moved with respect to the lever. The movement of this weight determines the speed at which the device will operate. It will be noted that the weight tends to swing downwardly so as to actuate the lever 27 in such a manner that it will tend to swing the tail piece parallel to the axis of rotation. When the tail piece 15 is at right angles to the axis of rotation, the operation of the device is stopped.

A manually controlled means for stopping the rotation of the device is carried by the wind mill and consists of a collar 31 which is slidably disposed in the tubing 3. The tubing has a slot 32 therein in which a bolt 33 is slidably disposed, the bolt being carried by the sleeve 31. A chain 34 is connected to the bolt 33 and is passed over an idler pulley 35, out through an opening 36 in the nipple 8, over an idler pulley 37, and is secured at its other end to one end of a lever 38. The bell crank lever 38 is pivotally carried at 39 by a bracket 40 which is secured to the support 23. The opposite end of the lever 38 is connected to the lever 27 by means of a chain 41.

The sleeve 31 is adapted to rotate with the tubing 3. A plate 42 is disposed upon the top of the sleeve 31 and is adapted to remain stationary and to permit the sleeve to rotate therebeneath. Ball bearings 43 aid in this purpose. Cables 44 connect the plate 42 with the base 21. A spring 45 is disposed around the tubing 3 and bears against a collar 46 and against the underside of the sleeve 31. This spring tends to move the sleeve 31 upwardly with respect to the tubing 3 so as to keep the cables 44 taut. When the cables 44 are pulled downwardly, the sleeve 31 is moved downwardly against the tension of the spring 45 and in turn pulls the chain 34 so as to actuate the lever 38 which in turn swings the arm 27 so as to release the tail piece 15, whereupon the tail piece will tend to swing, due to gravity, into a position at right angles to the axis of rotation of the fan 14. When the cables 44 are released, the spring 45 returns the sleeve 31 back to normal position, whereupon the tail piece 15 is swung into its normal position by the lowering of the weight 30.

From the foregoing description of the various parts of the device, the operation thereof may be readily understood. The pulley 22 is operatively connected to any device which is desired to be operated, by means of a belt (not shown). When the cables are in the position shown in Figure 1, the sleeve 31 is in its uppermost position, thereby permitting the weight to swing the tail piece into normal position. The arm is disposed so that the weight 30 pulls against the tail piece 15 and tends to swing it parallel to the axis of rotation of the fan 14. The fan is rotated by the air passing thereby, and as heretofore stated, tends to rotate the head 6 and the tail 15 with respect to the frame 1. This movement is prevented by means of the tail piece 15 which is held against rotation by the flow of air. When the fan increases in speed due to the greater velocity of the wind passing thereby, it tends to rotate the head 6 and the tail about the frame 1. This movement is in an anti-clockwise direction when looking down upon the top of the wind mill. It will therefore be seen that the tail piece 15 will tend to swing into a plane at right angles to the direction of the wind. Since the tail piece 15 is pivotally mounted at 26, the wind will tend to swing it in a clockwise direction when looking down upon the top of the wind mill, and will lift the weighted arm 27. The rotation of the head 6 upon the frame 1 and the swinging of the tail 15 with respect to the head 6 will continue until the force of the wind exerted upon the tail piece 15 balances the weight 30. In other words, the tail piece is adapted to be swung in one direction by the wind and in the other direction by the weight. The angle the tail piece takes with respect to the axis of the propeller 14 determines the angle which the propeller assumes with respect to the direction of the wind. For example, when the wind is blowing at a certain velocity, it will tend to swing the fan 14 so as to rotate the head 6, the head 6 in turn carrying the tail piece 15 into an angular position with respect to the wind. The tail piece instantly swings with respect to the housing 6 due to the wind so as to balance the two forces heretofore described. i. e., the force of the wind, and the force exerted by the weight. The tail moves with respect to the housing 6 so as to keep the speed of the fan constant irrespective of the velocity of the wind. The weight 30 provides a novel and simple means for regulating the speed to which the propeller 14 may be rotated. When the propeller exceeds this speed, it will rotate the housing 6 so as to dispose the propeller at such an angle with respect to the wind that the propeller will again return to its former speed. The speed may be changed by adjusting the weight 30.

In Figure 1 I have shown a novel means for stopping further rotation of the propeller 14. By pulling on the cables 44, the lever 38 is actuated so as to raise the arm 27 in the manner heretofore described. As soon as the arm 27 is raised, the tail piece 15 will swing about axis 26. This is due to the fact that the axis 26 extends at a slight angle from vertical so as to cause the tail piece 15 to swing at right angles to the axis of the propeller when the weight 30 is raised. This movement of the tail piece 15 is caused by gravity.

In addition to the manually controlled means for stopping the rotation of the propeller 14, I provide an electrically controlled means. This means comprises a governor which consists of two chains 47 that are secured to a collar 48 which in turn is rigidly secured to the shaft 19. The other ends of the chains 47 are secured to a sleeve 49 having an outwardly extending flange 50 at its lower end. The chains 47 tend to swing outwardly due to the centrifugal force when the shaft 19 is rotated and will raise the sleeve 49 so as to cause the flange 50 to engage with a switch arm 51. The arm 51 closes an electrical circuit to a motor 54 when it is swung into contact with the terminals 52 and 53 in electrical connection with each other. The motor is operatively connected to the cables 44 by cords 55 and 56 so as to pull downwardly upon the plate 42. It will therefore be observed that the same operation takes place as if the cables 44 were pulled downwardly by hand. A pawl 57 and a ratchet 58 prevents the cables from returning to normal position. The switch 51 automatically opens as soon as the shaft 19 stops rotating and opens the circuit to the motor.

It will be noted that the housing 6 is adapted to hold a lubricating oil therein. In this manner the gears 20 are constantly immersed in oil and will therefore rotate with little or no friction. The oil also works down along the shaft 19. The pipe 12 snugly receives the shaft 19 and prevents the oil from rapidly flowing down along the shaft 19, thus preventing the emptying of the reservoir of oil that is contained within the housing 6. The oil will slowly flow between the shaft 19 and the pipe 12 until it covers the entire length of the shaft 19 with a thin coating of oil. In this manner the shaft 19 freely rotates within the pipe 12. Furthermore, the pipe 12 stops the flow of oil in the housing 6. If it were not for the pipe 12, the oil would rapidly flow from the housing 6 and be wasted.

The device provides a novel means for operating a dynamo or the like by the movement of air. In the ordinary wind mills, the speed of the wind mill varies to such a great extent that it is practically impossible to adapt the wind mill as the power means for a dynamo, since it is a fixed rule that the dynamo should be rotated at a constant speed. With the present device the speed of the wind mill is automatically regulated, whereby the dynamo is rotated at a constant speed. The device is relatively simple in operation and is thoroughly efficient for the purpose intended.

I claim:

1. In a wind mill, a frame, a housing rotatably carried by said frame, a fan and tail piece carried by said housing, said fan being adapted to rotate said housing with respect to said frame, said tail piece being adapted to swing at right angles to the axis of rotation of said fan, a weighted lever operatively connected to said tail piece for moving said tail piece into alinement with the axis of rotation of said fan, said weight balancing the pressure of the wind against said fan when said fan is in operation, and manually controlled means operatively connected to said lever for swinging said lever into inoperative position, said tail being adapted to swing at right angles to the axis of rotation when released by said lever.

2. In a wind mill a housing, a tail carried by said housing, a fan carried by said housing, said tail being adapted to swing at right angles to the axis of rotation of said housing when freed to swing, means for yieldingly holding said tail in alinement with the axis of rotation of said housing and means for swinging said last named means into inoperative position, whereby said tail will swing at right angles to the axis of rotation.

3. A wind mill comprising a frame, a housing rotatably carried by said frame, a fan adapted to rotate said housing on said frame in one direction, a tail carried by said housing and being alined with the axis of rotation of said fan, said tail being swung by said housing when said fan is rotated, so as to extend transversely with respect to the current of air, and a weight operatively connected to said tail for swinging the tail into a transverse position with respect to the flow of air, said tail being swung into a position in which the pressure of the air will balance the force of the weight.

4. A wind mill comprising a frame, a housing rotatably carried by said frame, a fan and tail carried by said housing, means operated by said fan for rotating said housing, said tail being adapted to remain parallel to the flow of air when said housing is rotated, a weight for swinging the tail into a transverse position with respect to the flow of air, said tail assuming a position in which the pressure of the air current will balance the weight, this position of said tail swinging said fan with respect to the air current so as to keep the speed of the fan constant.

HARRY K. SOMERS.